Patented Oct. 22, 1935

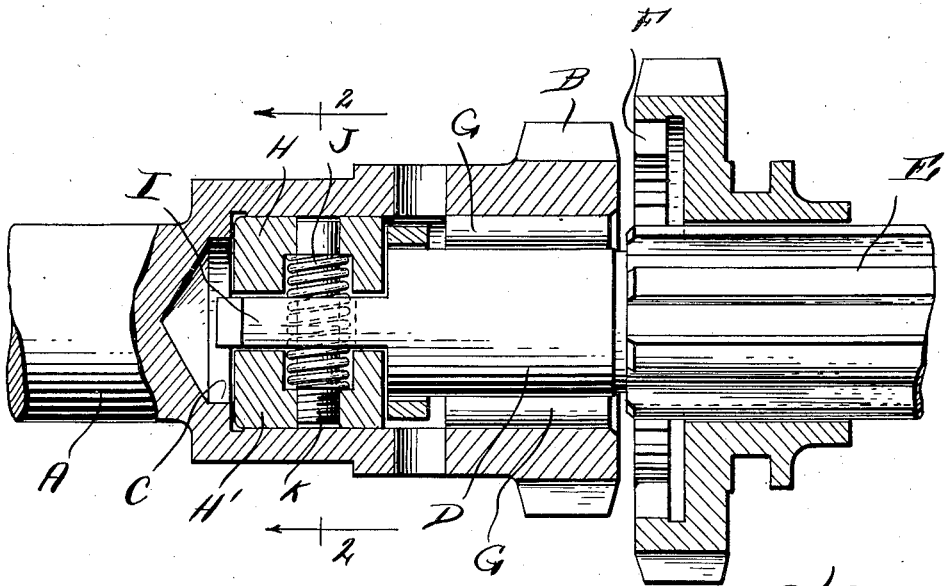
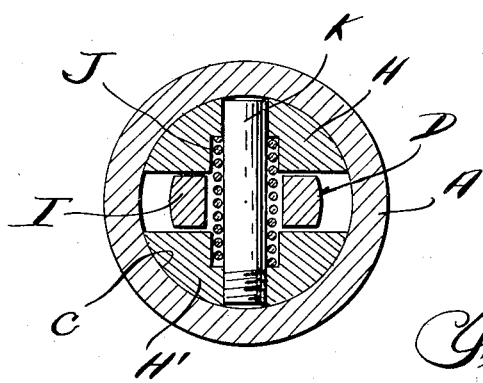

2,017,997

UNITED STATES PATENT OFFICE 2,017,997

SYNCHRONIZING MEANS FOR TRANSMISSION MECHANISMS

Horace T. Thomas, Lansing, Mich., assignor to Reo Motor Car Company, Lansing, Mich., a corporation of Michigan Application August 15, 1932, Serial No. 628,937

4 Claims. (Cl. 192—53)

The invention relates to transmission mechanisms and has more particular reference to means for synchronizing the rotations of adjacent members prior to the positive clutch engagement of the same. In the present state of the art it is quite common in transmission mechanisms to provide a positive clutch, one member of which is in the form of an external gear, and the other a corresponding internal gear. These two members are held in axial alignment by a stepped engagement of their respective shafts which permits rotation of said shafts at different speeds when the clutch members are disengaged. However, when the clutch members are moved into engagement with each other, this difference in speed of rotation will cause a clashing of the interengaging parts. It is the object of the present invention to provide a simple means operative when one of the shaft members is free and unloaded to cause the same to rotate at substantially the same speed as the other shaft member, so that the clutch members may be easily engaged with each other and without clashing. To this end the invention consists in the construction as hereinafter set forth.

In the drawing:

Figure 1 is a longitudinal section partly in elevation through a clutch mechanism provided with my improved synchronizing means;

Figure 2 is a cross section on line 2—2 of Figure 1.

As shown, A is a shaft member provided at one end with an external clutch member B and with a recess C for receiving the end portion D of an axially aligned shaft E carrying the cooperating internal gear clutch member F. The portion D of the shaft E has surrounding the same the rollers G engaging the socket C forming an anti-friction bearing for holding said shafts in axial alignment while permitting independent rotation.

My improved synchronizing means is arranged in the recess or socket C of the member A adjacent to the roller bearing G. It comprises a pair of segmental friction shoes H,H' arranged upon opposite sides of a flat tongue extension I of the portion D. These shoes are resiliently pressed outward against the inner peripheral face of the socket C, preferably by a spring J which engages aligned recesses in the flat faces of said shoes and is guided by a pin K extending radially between said shoes. One end of this pin is preferably threaded for engaging the correspondingly threaded socket in one of the shoes, while the other end of the pin slidably engages a radial bore in the other shoe. Thus the tension of the spring will determine the pressure of the shoes against the inner periphery of the socket C, thereby determining the friction. To permit of assembling the parts the flat tongue I is bifurcated to embrace the pin K and spring J surrounding the same.

With the parts constructed as described, when the shafts A and E are rotating at different speeds through the medium of transmission gearing (not shown), the anti-friction roller bearing G will permit of such rotation while the friction of the shoes H and H' is limited to an unobjectionable amount. When, however, one of the shafts, such for instance as A, is released from its gear engagement with the other shaft and is unloaded so as to be free for the rotation, the friction of the shoes H,H' will gradually cause this shaft to rotate at substantially the same speed as the shaft E. Thus after a short delay the clutch members B and F may be moved by suitable means (not shown) into engagement with each other without objectionable clashing.

The construction just described is one which can be readily provided in standard transmission gearings without alteration in construction other than the provision of an extra length of socket in the member A and the parts located therein. Thus the cost of manufacture is very slight while in operation the engagement of the clutch is facilitated and without clashing.

What I claim as my invention is:

1. In a transmission mechanism, the combination with axially aligned shaft members and cooperating clutch members carried thereby, of synchronizing means comprising a tongue projecting from one of said shaft members into a cylindrical recess in the other of said shaft members, said tongue having a flat face, a shoe of relatively small mass having a segmental face for fitting the cylindrical face of said recess and a flat face for engaging the flat face of said tongue, and a spring for yieldably pressing said shoe into frictional contact with the wall of said cylindrical recess with a predetermined limited pressure.

2. In a transmission mechanism, the combination with axially aligned shaft members and cooperating clutch members carried thereby, of synchronizing means comprising a flat tongue projecting from one of said shaft members into a cylindrical recess in the other of said shaft members, a pair of shoes arranged upon opposite sides of said tongue having flat faces for engaging the same and segmental faces for fitting the wall of said cylindrical recess, and a spring located in aligned recesses in said tongue and shoes having its opposite ends abutting against the latter and yieldably pressing the same against the wall of said cylindrical recess.

3. In a transmission mechanism, the combination with axially aligned shaft members, the co-operating clutch members carried thereby, of synchronizing means comprising a stepped portion on one of said shaft members, having an anti-friction engagement with a cylindrical recess in the other of said shaft members, a flat tongue projecting from said stepped portion into an extension of said cylindrical recess, shoes upon opposite sides of said tongue having flat faces for engaging the same, and segmental faces for fitting the wall of the cylindrical recess, a helical spring engaging aligned recesses in said tongue and shoes and having its opposite ends abutting against the latter, and a guide pin attached to one shoe extending through said helical spring and slidably engaging the other shoe.

4. In a transmission mechanism, the combination with axially aligned shaft members, one being provided with a cylindrical recess and the other with a cylindrical step portion of smaller diameter than said recess and having its end cut away on opposite sides to form a flat tongue, rollers between the cylindrical portion of said step and the wall of said cylindrical recess forming an antifriction and aligning bearing, segmental shoes of the same radius as said cylindrical recess and having flattened sides, said shoes being arranged on opposite sides of said tongue and having recesses therein in alignment with the recess in the tongue, a helical spring in said recess and a pin secured to one shoe projecting centrally through said recesses and into sliding engagement with the other shoe.

HORACE T. THOMAS.